O. HAMMERSTEIN.
CIGAR BANDING MACHINE.
APPLICATION FILED AUG. 31, 1908.

972,185.

Patented Oct. 11, 1910.
8 SHEETS—SHEET 1.

WITNESSES
G. V. Rasmussen
John Lotka

INVENTOR
OSCAR HAMMERSTEIN
BY
Briesen Knauth
ATTORNEYS

O. HAMMERSTEIN.
CIGAR BANDING MACHINE.
APPLICATION FILED AUG. 31, 1908.
972,185.
Patented Oct. 11, 1910.
8 SHEETS—SHEET 2.
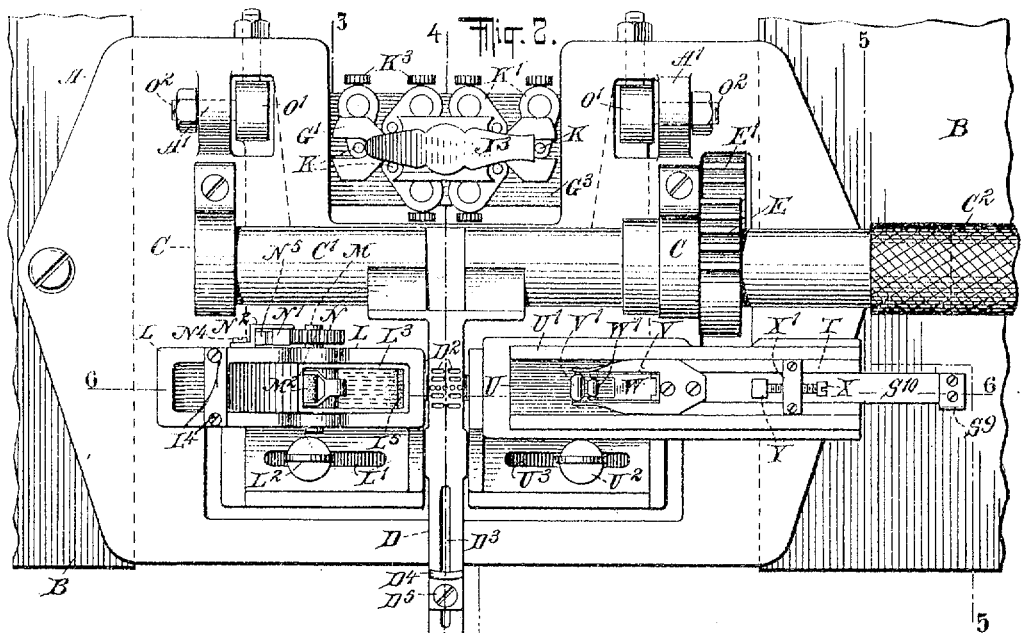
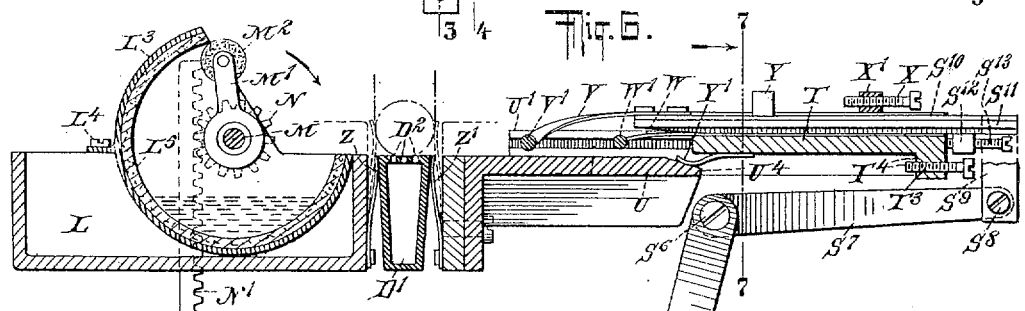
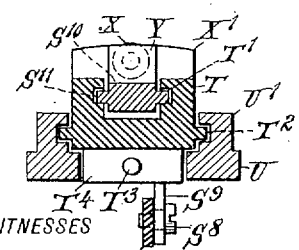
WITNESSES
G. V. Rasmussen
John Lotka
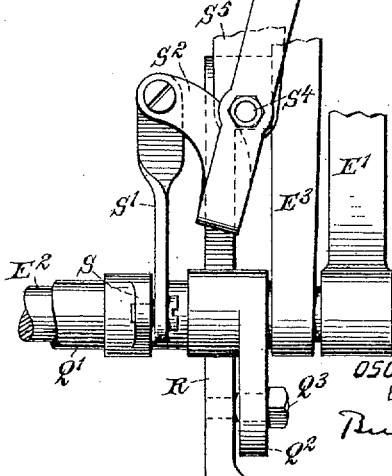
INVENTOR
OSCAR HAMMERSTEIN
BY
Breesen & Knauth
ATTORNEYS

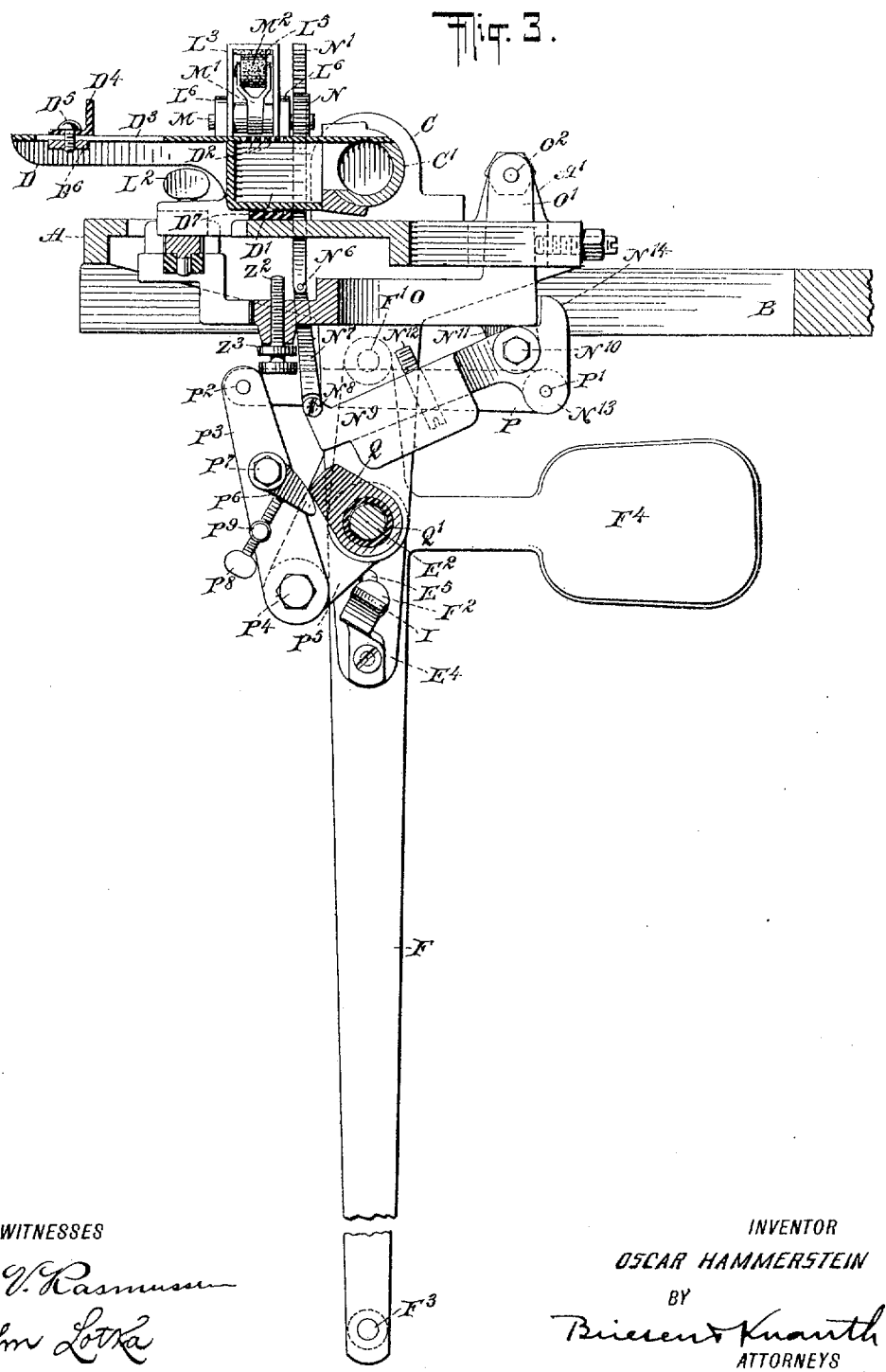

O. HAMMERSTEIN.
CIGAR BANDING MACHINE.
APPLICATION FILED AUG. 31, 1908.

972,185.

Patented Oct. 11, 1910.
8 SHEETS—SHEET 4.

WITNESSES
G. V. Rasmussen
John Lotka

INVENTOR
OSCAR HAMMERSTEIN
BY
Brierent Knauth
ATTORNEYS

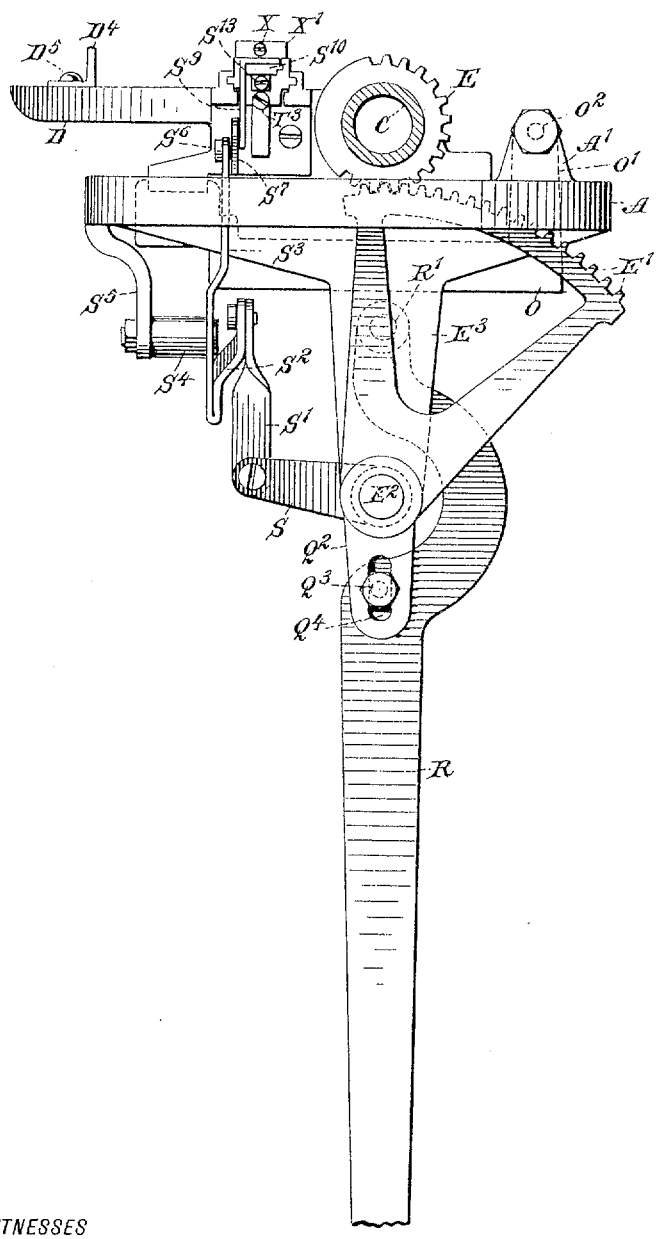

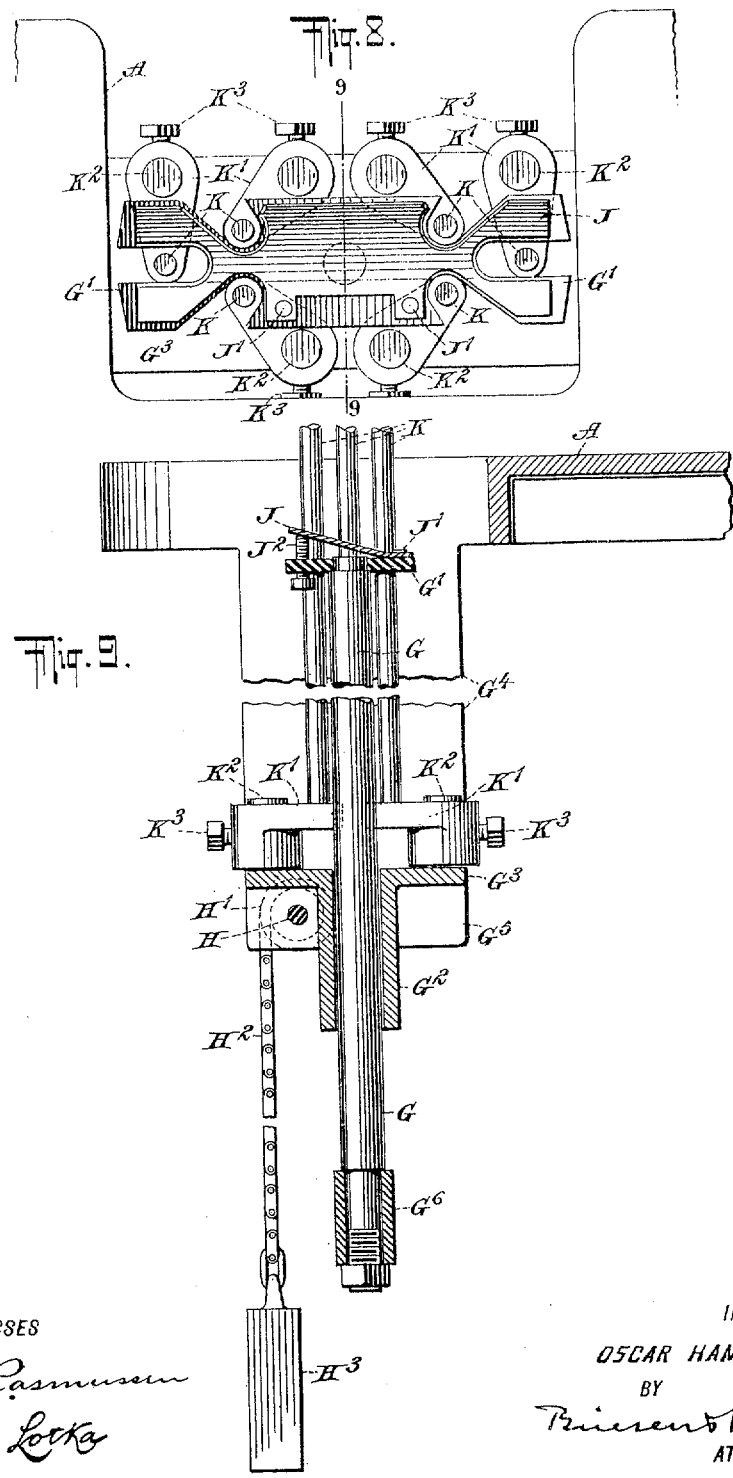

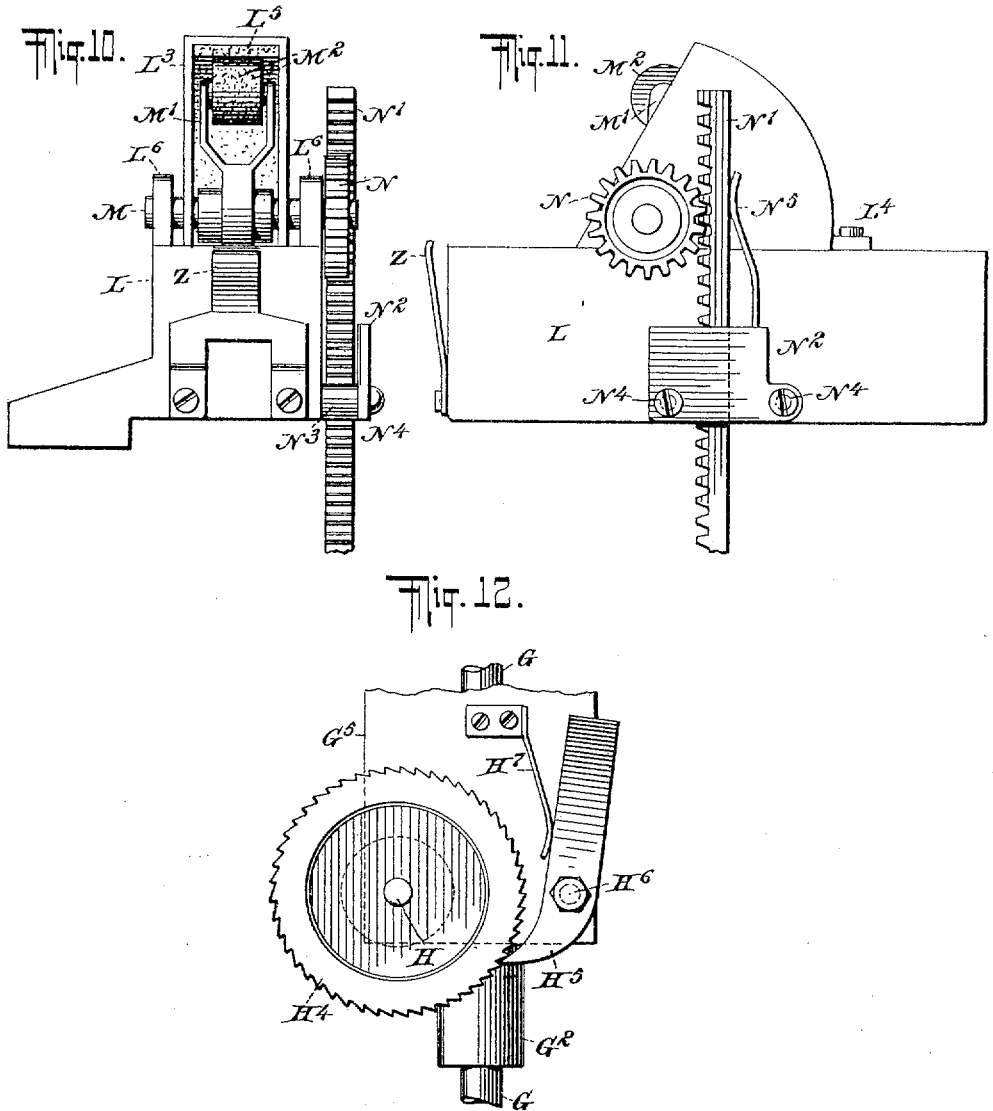

O. HAMMERSTEIN.
CIGAR BANDING MACHINE.
APPLICATION FILED AUG. 31, 1908.
972,185.
Patented Oct. 11, 1910.
8 SHEETS—SHEET 8.
Fig. 13.  Fig. 14.
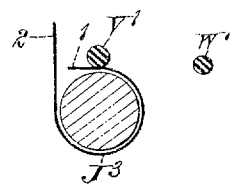 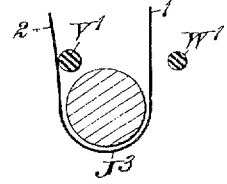
Fig. 15.  Fig. 16.
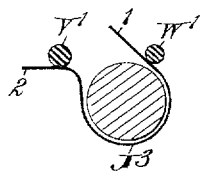 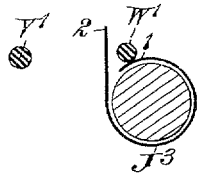
Fig. 17.  Fig. 18.
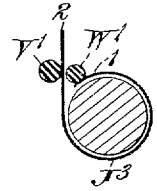 
Fig. 19.
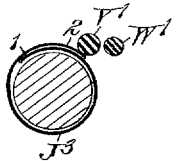
WITNESSES
G. V. Rasmussen
John Lotka
INVENTOR
OSCAR HAMMERSTEIN
BY
Briesen & Knauth
ATTORNEYS

UNITED STATES PATENT OFFICE.

OSCAR HAMMERSTEIN, OF NEW YORK, N. Y.

CIGAR-BANDING MACHINE.

972,185. Specification of Letters Patent. Patented Oct. 11, 1910.

Application filed August 31, 1908. Serial No. 450,939.

*To all whom it may concern:*

Be it known that I, OSCAR HAMMERSTEIN, a citizen of the United States, and resident of the borough of Manhattan, city, county, and State of New York, have invented certain new and useful Improvements in Cigar-Banding Machines, of which the following is a specification.

My invention relates to machines for applying the bands to cigars and has for its object to provide a machine of this description which is positive and simple in operation; which will band each cigar in exactly the same place and which will apply the band effectively after the cigar has become somewhat angular in cross section due to having been placed in a receptacle while moist and then subjected to pressure.

My invention will be fully described hereinafter and the features of novelty will be pointed out in the appended claims.

Reference is to be had to the accompanying drawings in which—

Figure 1:
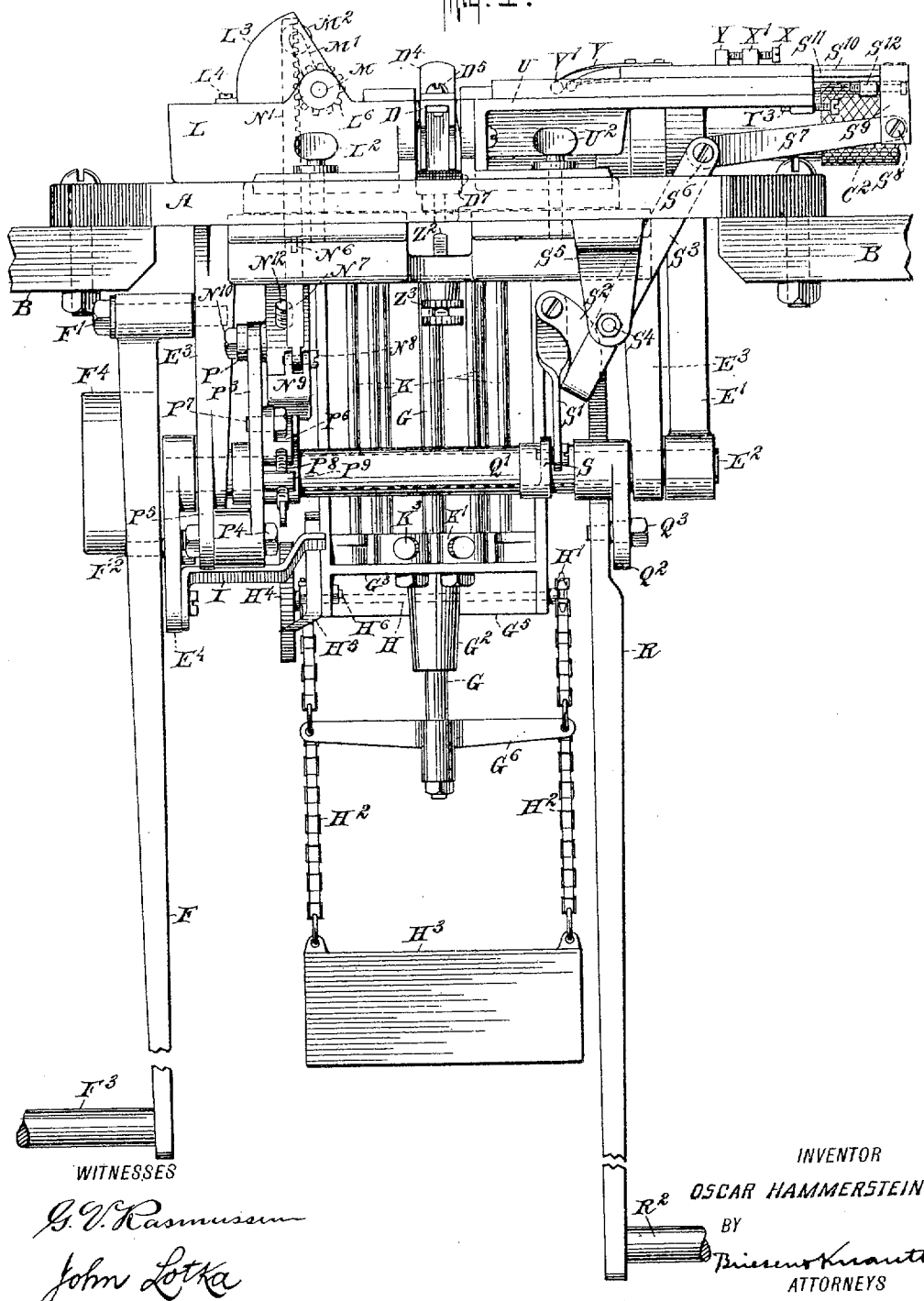
Figure 4:
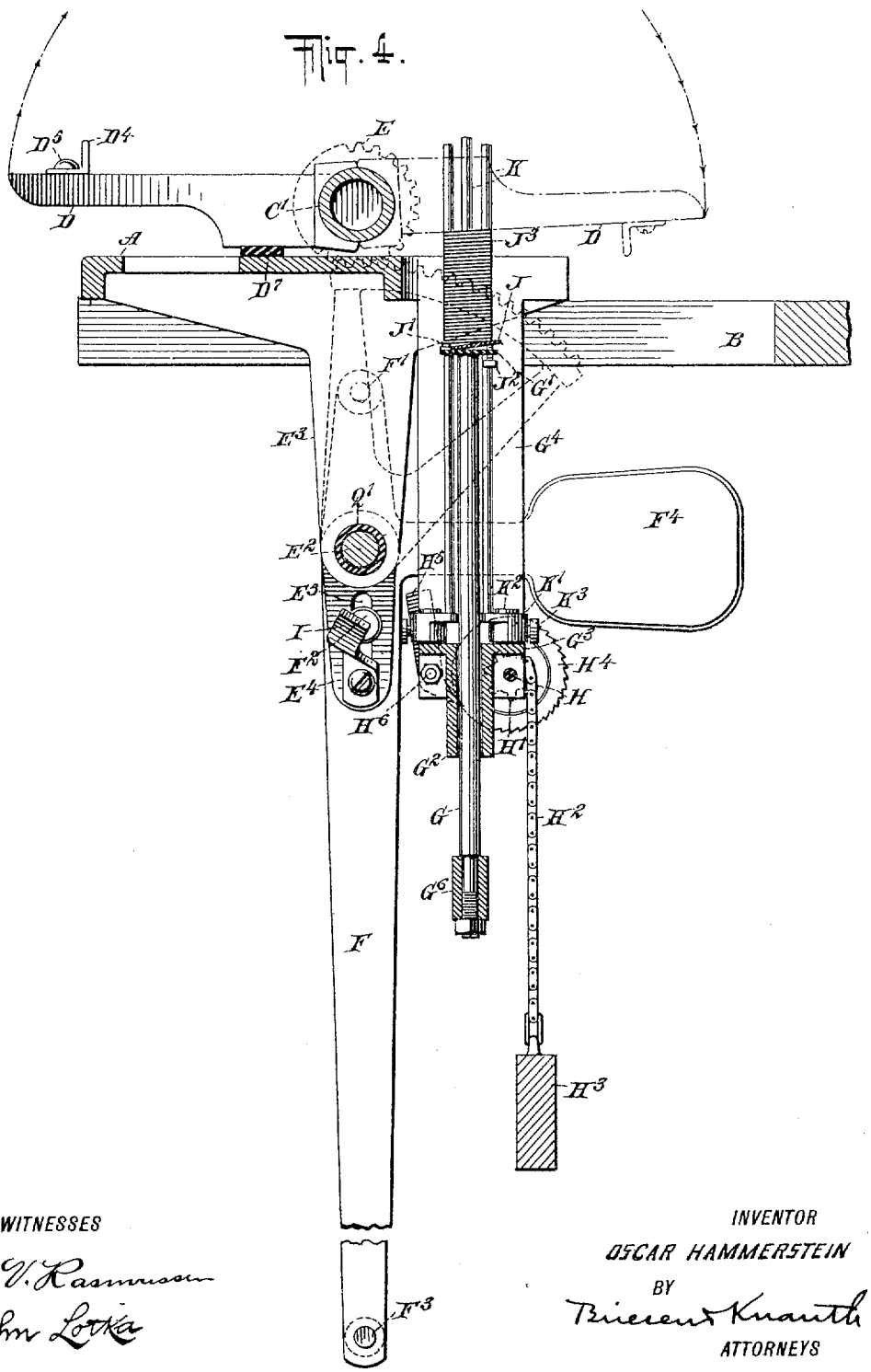

Figure 1 is a front elevation of my improved machine; Fig. 2 is a plan view thereof; Fig. 3 is a cross-section on the line 3—3 of Fig. 2; Fig. 4 is a similar view on the line 4—4 of Fig. 2; Fig. 5 is a similar view on the line 5—5 of Fig. 2; Fig. 6 is a detail sectional view on line 6—6 of Fig. 2; Fig. 7 is a detail cross section on line 7—7 of Fig. 6; Fig. 8 is a detail plan view of the band holder; Fig. 9 is a sectional view thereof on line 9—9 of Fig. 8; Fig. 10 is a detail elevation of the moistening device; Fig. 11 is a detail side view thereof; Fig. 12 is a detail elevation of a portion of the band holder; and Figs. 13 to 19 inc. are diagrammatic views illustrating the various steps in the banding operation.

In the drawings, the bed plate A of the machine is shown secured to a table B, or it might be carried by any suitable supports. This bed plate A is provided with standards C which form bearings for the chambered shaft $C'$, which has its open end connected with a suction device by means of a flexible tube $C^2$ for a purpose to be described hereinafter. D is a band-carrier or support secured to the shaft $C'$ and having a suction box $D'$ in communication with the chamber of said shaft $C'$ as clearly shown in Fig. 3. The upper surface of the suction box $D'$ is perforated as indicated at $D^2$ and the end-portion of the band-carrier or support is provided with a slot $D^3$ in which a projection $D^4$ is adjustable. This projection $D^4$ is held in its adjusted position by means of a screw $D^5$ and a sliding block $D^6$. A gear E is carried by the shaft C to rotate therewith and meshes with a segment $E'$ secured to one end of a shaft $E^2$ hung in bearings $E^3$ which project downwardly from the bed plate A. At the opposite end the shaft $E^2$ is provided with a crank $E^4$ having a slot $E^5$.

F is a lever extending downwardly and fulcrumed at $F'$ on one of the bearings $E^3$ and provided with a pin $F^2$ which extends into the slot $E^5$ of the crank $E^4$. At its lower or free end, which is located adjacent to the floor, the lever F carries an operating foot-piece $F^3$, the particular object of which will appear more clearly farther on.

$F^4$ is a weight secured to the lever F for returning said lever to its initial position.

G is a rod for supporting a shelf $G'$ at its upper end and arranged to slide vertically through the bearing sleeve $G^2$ which forms part of a table $G^3$ secured to the bed plate A by means of supports $G^4$.

A shaft H is journaled in flanges $G^5$ of said table and carries sprocket wheels $H'$ over which pass sprocket-chains $H^2$ the one end of each of which is secured to a cross piece $G^6$ fastened to the free end of the rod G. The opposite ends of the said sprocket chains $H^2$ are secured to a counter-balance weight $H^3$. A ratchet wheel $H^4$ is also mounted on the shaft H and is engaged by a pawl $H^5$ pivoted at $H^6$ on one of the supports $G^4$. The operative end of said pawl is pressed toward the teeth of the ratchet $H^4$ by a spring $H^7$ and prevents said ratchet from rotating in one direction.

I is a releasing member fastened to the crank $E^4$ and serves to release the pawl $H^5$ from engagement with the ratchet $H^4$ under certain conditions as will appear hereinafter.

J is a resilient member having its longitudinal edge partly secured to the shelf $G'$ by screws $J'$ and its opposite longitudinal edge entirely free therefrom and adjustable to different degrees of inclination through the medium of a screw $J^2$. This resilient member serves as a support for the supply of bands $J^3$ and maintains said bands in an inclined position. Rods K extends upwardly adjacent to the resilient member J from pivot pieces $K'$ fulcrumed on studs $K^2$ which form part of the table $G^3$, said rods serving as a means for preventing the supply of bands from becoming disarranged. The said pivot pieces K' and with them the rods K are adjustable about the studs $K^2$ to accommodate different sizes and styles of bands and are secured in their adjusted positions by means of set screws $K^3$. A receptacle L is mounted on the bed plate A and is provided with a slot L' so as to be adjustable toward and away from the carrier D, being held in its adjusted position by means of a thumb screw $L^2$. A trough $L^3$ is secured in said receptacle L through the medium of screws $L^4$ and serves as a container for water, and is preferably provided with a felt or similar lining $L^5$. A shaft M is journaled in bearings $L^6$ on the receptacle L and extends through and across the trough $L^3$. This shaft M carries a forked member M', in the forked end of which a moistening roller $M^2$ of felt or similar material is carried. This forked member M' is so positioned on the shaft that the roller $M^2$ travels along the lining $L^5$ of the trough $L^3$ so as to be kept continually moist, it being understood that the lining is arranged in a circular path with the shaft M as a center. A pinion N is mounted on the shaft M to rotate therewith and meshes with a vertically traveling rack N' guided between a member $N^2$ and the one side wall of the receptacle L. The member $N^2$ is spaced from the said side wall of the receptacle L by washers $N^3$ (Fig. 10) and is secured in position through the medium of screws $N^4$. The rack N' is maintained in engagement with the pinion by means of a flat spring $N^5$ carried by the member $N^2$. The lower end of the rack N' is pivotally secured at $N^6$ to a link $N^7$ which in turn is pivoted at $N^8$ to one member $N^9$ of a bell crank lever fulcrumed at $N^{10}$ on a lug $N^{11}$ forming part of an auxiliary frame O. This auxiliary frame O has lugs O' formed thereon, which lugs are pivoted at $O^2$ to ears A' forming part of or secured to the bed plate A. The member $N^9$ of the bell crank lever is provided with an adjustable stop screw $N^{12}$, arranged under certain conditions for engagement with the lower surface of the frame O. A lever P is pivoted at P' to the other member $N^{13}$ of the bell crank and is pivotally connected at $P^2$ with a swinging member $P^3$ fulcrumed at $P^4$ to a lug $P^5$ forming part of the one bearing $E^3$.

$N^{14}$ is a stop lug formed on the bell crank member $N^{13}$ and is arranged to engage the frame O to limit the movement of said bell crank in one direction. An adjustable contact piece $P^6$ is secured at $P^7$ to the swinging member $P^3$ and is adjusted to various angles by a screw $P^8$ which works in a bearing $P^9$. The contact piece $P^6$ is adapted to be engaged by a cam member Q secured to one end of the sleeve Q' carried by the shaft $E^2$. This sleeve Q' is provided at its other end with a crank $Q^2$ which rotates with said sleeve but is mounted on the shaft $E^2$. A pin $Q^3$ extends through a slot $Q^4$ in the crank $Q^2$ and screws into a lever R fulcrumed at R' upon the one bearing $E^3$. The lower end of this lever R is arranged near the floor and is provided with a foot piece $R^2$ in the same manner as the lever F hereinbefore mentioned.

S is a lever secured to the sleeve Q' to rotate therewith and pivotally connected by means of a link S' with a projection $S^2$ forming part of or secured to another lever $S^3$ which is fulcrumed at $S^4$ on a lug $S^5$ projecting downwardly from the bed plate A. This lever $S^3$ also has secured to it at $S^6$ one end of the link $S^7$ the other end of which is pivotally secured at $S^8$ to a lug $S^9$ forming part of a slide $S^{10}$. This slide $S^{10}$ is provided with longitudinal tongue pieces $S^{11}$ which travel in grooves T' of a second slide T. This second slide T is also provided with longitudinally extending pieces $T^2$ which extend into grooved pieces U' projecting upwardly from a support U adjustable toward and away from the finger piece D and held in its adjustable position through the medium of a thumb screw $U^2$ working in conjunction with a slot $U^3$ in said support U. Resilient arms V are secured to the slide $S^{10}$ and carry between their free ends a roller V' and similar arms W are fastened to the slide T and carry between their free ends a similar roller W'. A screw threaded projection $S^{12}$ is fastened to the lower surface of the slide $S^{10}$ and accommodates an abutment screw $S^{13}$. A similar abutment screw $T^3$ projects through a similar projection $T^4$ in the slide T and coöperates with the portion $U^4$ of the support U to limit the movement of the slides in one direction.

X is an adjustable screw extending through a block X' secured to the upper surface of the slide $S^{10}$ and Y is a bridge piece which is fastened to the slide T and operates in conjunction with the said screw X to effect certain operations to be more fully brought out hereinafter.

Y' is a spring carried by the slide T and frictionally engaging the upper surface of the support U. Leaf springs Z and Z' are secured respectively to the receptacle L and the support U so as to have their free ends adjacent to the suction box D' of the carrier D. A screw $Z^2$ extends through a portion of the auxiliary frame O and serves to limit the upwardly swinging movement of said frame O. A lock nut $Z^3$ is provided for maintaining said screw $Z^2$ in its adjusted position.

The operation of the machine is as follows: The suction device is first started so that the air is withdrawn from the suction chamber D' through the chambered shaft C' and a continuous suction produced at the openings $D^2$. The projection $D^4$ is now set at the point desired so as to position the cigar during the banding operation, it being understood that one end of the cigar abuts against this projection while the band is being applied. The operator by pressure on the foot piece $F^3$ swings the lever F on its fulcrum $F'$ to the rear of the machine and with it the crank $E^4$ thus causing the shaft $E^2$ to be partly rotated in its bearings. As the shaft $E^2$ is rotated as just described the segment $E'$ is swung in the arc of a circle to the left in Fig. 4 and the pinion E is caused to revolve. Owing to the fact that the pinion E is secured on the chambered shaft $C'$ this shaft will be rotated with the said pinion and will swing the carrier D to the position shown by dotted lines in Fig. 4. In this position the openings $D^2$ are located directly over the supply of bands $J^3$ with the surface in which the openings $D^2$ are located in engagement with the uppermost band. As this engagement takes place the uppermost band is drawn toward the suction box and held there by the suction. The operator now removes his foot from the foot piece $F^3$ and as the pressure is thus removed, the weight $F^4$ will cause the lever F to be returned to its initial position and with it, through the connections above described the carrier D with the band held adjacent to the suction box. The cigar to be banded is now placed lengthwise of the carrier D over the band, with its one end abutting against the projection $D^4$. The operator now exerts a pressure on the foot piece $R'$ and swings the lever R to the rear of the machine in the same manner as described with reference to the lever F. This operation will cause the crank $Q^2$ to be swung in the arc of a circle and will rotate the sleeve $Q'$, and with it the cam member Q. As this cam member Q is swung downwardly in Fig. 3 as just described, it will press against the contact piece $P^6$ and will swing the lever $P^3$ to the left in Fig. 3. A pull will thus be exerted on the link P and the bell crank will be swung on its pivot $N^{10}$ and the member $N^9$ thereof will be raised. As this takes place the rack $N'$ will be raised, through the medium of the link $N^7$ and the pinion N will be caused to rotate and with it the shaft M. During this movement the roller $M^2$ travels downward and passes over the pasted end of the band which is pressed against the lining $L^5$ and thus moistened on both sides. Continued pressure on the lever R tends to farther raise the member $N^9$ until the end of the screw $N^{12}$ engages the auxiliary frame O and then to swing the entire frame O on its pivot $O^2$ so as to raise the forward end thereof, until the end of the screw $Z^2$ abuts against the lower surface of the bed plate A. The springs Z and $Z'$ being also raised during this operation cause the ends of the band to be folded upwardly so that the said band assumes the position shown in Fig. 6.

While the above movements are taking place the rotation of the sleeve $Q'$ also causes the crank S to swing downwardly thus exerting a pull on the links $S'$ and moving the upper end of the lever $S^2$ to the left in Fig. 1. This movement of the lever $S^3$ pulls the slide $S^{10}$ to the left in Fig. 1 through the medium of the link $S^7$ and as the movement continues and the end of the screw $S^{13}$ abuts against the end of the slide T, this second slide T will also be moved to the left in Fig. 1 so that the two slides $S^{10}$ and T are substantially coupled together, and the rollers $V'$ and $W'$ are spaced from each other as clearly shown in Fig. 6. As the lever R is now swung still farther rearwardly the cam member Q will pass the contact member $P^6$ and permit the auxiliary frame, the rack and moistening roller and parts to return to their normal position, and the first roller $V'$ will ride up on the cigar and press the portion 1 of the band $J^3$ to the position shown in Fig. 13. The two slides $S^{10}$ and T are now moved still farther to the left until the roller has passed the portion 1 of the band which owing to its elasticity will snap back to its initial position as shown in Fig. 14. In this position the roller $V'$ has just engaged the portion 2 of the band and as the slides continue to move in the same direction the said roller $V'$ will depress the portion 2 of the band to the position shown in Fig. 15. In this position the roller $W'$ has begun to ride up on the cigar and to bend the portion 1 of the cigar band as shown in Fig. 15. The slides continuing to move still farther, the roller $V'$ will pass the end of the portion 2 of the band which will immediately snap back to its initial position and the roller $W'$ will bend the portion 1 of the band farther around the cigar. (Fig. 16.) The lever R has now reached the limit of its rearward movement and is ready to be pulled back to its original position. During this return movement of the lever R the sleeve $Q'$ is rotated in the reverse direction and the crank S is raised and pushes upwardly on the link $S'$ and swings the upper end of the lever $S^3$ to the right in Fig. 1. This operation will accordingly push the slide $S^{10}$ to the right and owing to the fact that there is no direct connection between the slides, the slide T will remain stationary, being held against accidental movement by the friction spring $Y'$. The roller $W'$ which is carried by the slide T therefore remains stationary, while the roller $V'$ which is carried by the slide $S^{10}$ is moved to the position shown in Fig. 17. At this stage of the return movement of the parts the bridge Y has come into engagement with the end of the screw X which is carried by the slide $S^{10}$. The slides are now again coupled together with the two rollers V' and W' in substantially the position shown in Fig. 17. As the slide S¹⁰ is now pushed farther on in its return movement due to continued pull being exerted on the lever R, the slide T will be carried along with it and the moist pasted end 2 of the cigar band will be brought over the portion 1 of said band by the roller V' as shown in Fig. 18. During this part of the operation the part 1 of the band is held in position around the cigar by the roller W' which gradually travels backward slightly in advance of the roller V'. The return movement is continued until the roller V' has completely passed over the end 2 of the band and pasted it down on the part 1 thus securely fastening the band in position on the cigar. (Fig. 19.) The parts now continue to return and finally reach their normal positions after which the operation is repeated.

Owing to the fact that the arms V and W in which the rollers V' and W' are mounted are resilient sufficient pressure is produced on the band to securely bind the two ends together. This pressure is augmented by the fact that the rollers when in their normal position or in a slightly lower plane than the uppermost portion of the cigar, so that the rollers ride up on said cigar during the banding operation against the tension of said arms V and W. During the return movement of the parts described above the cam member Q will lift the contact member P⁶ on its pivot P⁷, (no resistance being offered to this movement), without operating any of parts. The swinging movement of the auxiliary frame O is increased or diminished by adjusting the screw Z², the contact member P⁶ being adjusted to correspond through the medium of the screw P⁸. As successive bands are removed from the supply the uppermost band will be in a slightly lower horizontal plane each time and finally the uppermost band will be in a plane too low for the suction box to pick it up. To overcome this difficulty the crank E⁴ is provided with a projection I which is arranged to engage the upper end of the pawl H⁵ during an abnormal rearward movement of the lever F. As the said projection I engages said end of the pawl, the lower end thereof will be swung away from the ratchet and the counterbalance weight H³ will cause the chain H² to pull on the piece G⁶ and thus raise the shelf G' and with it the supply of bands until the upper one comes into engagement with the suction box D'. As soon as pressure is removed from the lever F the pawl will snap back into engagement with the ratchet. Thus as long as the uppermost band is in a plane sufficiently high to be engaged and picked up by the suction box, the rearward movement of the lever will not be sufficient to cause the projection I to engage and operate the pawl H⁵. As soon however, as the uppermost band is too low this rearward movement of the lever F will be increased owing to the fact that the suction box D' is permitted to travel a greater distance and the projection I will engage and operate the pawl as above described. If desired a cushion D⁷ of rubber or similar material may be attached to the bed plate A for the suction box to abut against at the end of its return movement to its initial position to take up any jar or shock.

With my invention it is thus possible to automatically band each cigar rapidly and effectively, and each band is applied in exactly the same place on each cigar of the same kind. The mechanism is easily adjustable to different sizes and styles of cigars and bands and can be easily and simply operated without the necessity of any special instruction. My improved machine will apply cigar bands equally well to cigars which still retain their original round shape and to those which have become more or less angular in cross section by being packed close together into a box. The yielding rollers V' W' will readily follow any irregularity in the shape of the cigar.

I claim—

1. In a cigar banding machine, a movable suction device for carrying a band and for supporting the article to be banded and separate mechanism arranged to fold the band about the cigar or similar article.

2. A banding machine comprising a holder for the bands, a band carrier having suction connections to hold a band in position on one of its faces, said band carrier being movable from an inverted position with the band carrying face over the holder to a position with said face uppermost and separate means arranged to fold the band about a cigar or similar article when the carrier is in its last named position.

3. A banding-machine comprising a holder for the bands, a movable band-carrier having suction connections to pick up a band from the holder and hold it in position on said carrier and to act as a support for the article to be banded, means for moistening only the one end of said band and mechanism for folding the band completely around a cigar or similar article.

4. A banding machine comprising a holder for the bands, a movable band-carrier or support having suction connections to pick up a band from the holder, said carrier being movable toward and from said holder, an adjustable projection adapted to position the cigar or other article on the band-carrier after the latter has been returned to its initial position and mechanism for folding the band about the cigar or other article.

5. A banding machine comprising a holder for the bands, a movable band carrier having suction connections to pick up a band from the holder, said carrier being movable toward and from the holder, a movable frame and means carried by said frame for folding the band about a cigar or similar article.

6. A banding machine comprising a support for the band and cigar or other article, a movable frame for partly folding said band about the cigar or other article, a slide for completely folding one portion of the band about the cigar or other article, a second slide for completely folding the other portion of the band about the cigar or other article, and means for moving said frame and said slides.

7. A banding machine comprising a holder for the bands, a movable band carrier arranged to be moved toward and from said holder to bring a band to a position for folding it about a cigar or other article, a receptacle for a liquid and a roller for moistening the one end of said band arranged to travel into and out of the liquid in said receptacle.

8. A banding machine comprising a carrier for the band and for the article to be banded, superposed slides movable relatively to each other in the same direction for folding the band about the said article and means for moving said slides.

9. A banding machine comprising a carrier for the band and for the article to be banded, slides movable relatively to each other in the same direction, resilient means on each of said slides adapted to fold the band about the article and means for moving said slides.

10. A banding machine comprising a carrier for the band and for the article to be banded, slides for folding the band about the article, said slides moving together in one direction and moving relatively to each other for a distance in the other direction, means for coupling the two slides together to secure a combined movement of the two throughout the remainder of the second movement and means for moving said slides.

11. In a banding machine, a carrier for the band, a liquid receptacle, a moistening roller arranged to travel over the end of the band in the arc of a circle about an axis parallel with the axis of rotation of said roller into and out of the liquid in said receptacle, and means for operating said roller.

12. In a banding machine, a support for a supply of the bands, retaining devices on said support for maintaining said bands in position, means secured to said support and inclined relatively thereto for giving the bands an inclined position and a band carrier movable toward and from said support for picking up a band from the supply and for serving as a support for the article to be banded.

13. In a banding machine, a support for a supply of the bands, retaining devices on said support for maintaining said bands in position, a movable means having a portion secured to said support and another portion free therefrom for giving said bands an inclined position, a device for moving the free portion of said means relatively to said support for adjusting the degree of inclination and a band carrier movable toward and from said support for picking up a band from the supply and for serving as a support for the article to be banded.

14. A banding machine comprising a support for a supply of the bands, a movable suction device arranged to carry the bands individually from the support and to support the article to be banded after said device has returned to its initial position with the band and means for operating said movable suction device.

15. A banding machine comprising a support for a supply of the bands, a movable suction device arranged to carry the bands individually from the support and to support the article to be banded after the said device has returned to its initial position, adjustable means on said movable device for positioning the said article thereon and means for operating said device.

16. A banding machine comprising a holder for the bands, mechanism movable linearly for applying the band to the cigar or other article, moistening means movable in a path at an angle to the path of said mechanism, and a band carrier for picking up a band from the holder movable to a position between the band applying mechanism and the moistening means.

17. In a banding machine, a support for the band and the article to be banded, a device for moistening the one end of the band located at one side of said support and means for folding the band about the article, said means being located on the opposite side of said support and movable toward and away therefrom.

18. In a banding machine, a single support for the band and the article to be banded, a device for moistening the one end of the band movable in a plane at an angle to the plane of the support and means for applying the band to the article, said means being movable in a plane at an angle to the plane in which the moistening device moves.

19. In a banding machine, a support for the band and the article to be banded, superimposed slides for applying the band to the article, said slides being arranged to move together in one direction and being capable of a limited movement relatively to each other in the opposite direction and means for actuating said slides.

20. In a banding machine, a support for the band and the article to be banded, slides arranged to move together in one direction and capable of a limited movement relatively to each other in the opposite direction, resilient means on each of said slides adapted to fold the band about the article and means for actuating said slides.

21. In a banding machine, a support for the band and for the article to be banded, a device for moistening the said band, said device comprising a receptacle for a liquid and a roller movable into and out of said liquid and means for actuating said roller.

22. In a banding machine, a support for the bands and the article to be banded, a receptacle for a liquid located adjacent to said support, an arm pivoted in said receptacle, a roller rotatably mounted on said arm and means for rocking said arm to move the roller across the band and into and out of the liquid in said receptacle.

23. In a banding machine, a holder for the bands, a hollow shaft connected with a suction device, a band carrier secured to said shaft and in communication with the interior thereof, a device for moistening the band, means for applying the band to the article to be banded located adjacent to said moistening device and mechanism for rotating said shaft to move said band carrier to the band holder to pick up a band and then to a point between said moistening device and said band applying machine.

In testimony whereof, I have hereunto set my hand in the presence of two subscribing witnesses this 11th day of August 1908.

OSCAR HAMMERSTEIN.

Witnesses:
JOHN A. KEHLENBECK,
JOHN LOTKA.